June 29, 1954

W. R. KROMER

METHOD OF AND APPARATUS FOR
STORING, COOLING, AND
DISPENSING BEVERAGES 2,682,160

Filed Aug. 3, 1950

INVENTOR
*Wallace R. Kromer*
BY *Evans + McCoy*
ATTORNEYS

June 29, 1954

W. R. KROMER 2,682,160

METHOD OF AND APPARATUS FOR
STORING, COOLING, AND
DISPENSING BEVERAGES

Filed Aug. 3, 1950

INVENTOR
Wallace R. Kromer
BY Evans + McCoy
ATTORNEYS

June 29, 1954

W. R. KROMER 2,682,160

METHOD OF AND APPARATUS FOR
STORING, COOLING, AND
DISPENSING BEVERAGES

Filed Aug. 3, 1950

INVENTOR
Wallace R. Kromer
BY Evans + McCoy
ATTORNEYS

Patented June 29, 1954

2,682,160

UNITED STATES PATENT OFFICE 2,682,160

METHOD OF AND APPARATUS FOR STORING, COOLING, AND DISPENSING BEVERAGES

Wallace R. Kromer, Cleveland Heights, Ohio

Application August 3, 1950, Serial No. 177,410

15 Claims. (Cl. 62—141)

This invention relates to an improved method of and apparatus for storing, cooling and dispensing beverages; the invention having particular utility for carbonated beverages such as beer, ale and the like. Reference is made to copending application for patent Serial No. 121,606 filed October 15, 1949 for Method of and Apparatus for Storing, Cooling and Dispensing Beverages, now Patent No. 2,646,667, which relates to similar subject matter.

In addition to the problems incident to dispensing palatable beverage drawn from transit containers containing various quantities of beverage at different temperatures, as outlined in the application referred to, and in addition to the problems incident to providing a system that is adaptable to various types of installations, also mentioned in such application, there are other problems incident to providing an efficient system that can be manufactured at low cost and that can be operated over long periods of time without need for adjustment or special service. It has been found that in utilizing a liquid refrigerant in direct heat exchanging relation to beverage for the purpose of bringing the beverage to the desired temperature, the refrigerating load varies over a relatively wide range. For example, a tavern operator will have periods of rush business during which beer or other carbonated beverage is drawn substantially continuously from the transit containers on tap, while the same tavern operator will have other periods of slack business during which very little beverage is withdrawn from the dispensing system and the refrigerating unit is only required to maintain equilibrium and withdraw heat absorbed by the system.

It is therefore one of the principal objects of the present invention to provide a generally improved beverage storing, cooling and dispensing system and method employing a volatile refrigerant in direct heat exchange relation to the beverage, which system responds quickly to changes in loads. More particularly, it is sought to provide such a system which, although capable of adequately cooling large volumes of beverages such as on continuous withdrawal, avoids cooling of beverages in the system below a predetermined temperature during periods of inactivity. As a special feature of this phase of the invention the beverage is held within relatively close temperature limits regardless of the rate of withdrawal.

Another object is to provide an improved carbonated beverage dispensing system employing a cooling method in which transportation containers holding beverage are held in a controlled refrigerated atmosphere prior to withdrawal and final chilling of the beverage to the desired dispensing temperature and which method automatically maintains gas pressure in each individual transit container in accordance with the balance pressure of the beverage in each container as determined by the temperature of such beverage.

Another object is to provide a beverage dispensing system and cooling method employing volatile refrigerant as a cooling agent wherein heat interchange between the beverage and the refrigerant occurs in a specialized device in which the path of the beverage and the path of the refrigerant are each of relatively small cross sectional area and substantially parallel one another. More specifically, it is sought to provide a specialized beverage cooling device employing the counterflow principle so that the beverage not only follows a path paralleling that of the refrigerant but flows over such path in a direction opposite to the direction of flow of the companion refrigerant.

Another object is to provide, for use in a system of the character mentioned, a compact unit capable of performing multiple refrigerating functions. In a preferred embodiment the apparatus for cooling the pre-cooler, the beverage being drawn, and the circulating coolant or water is contained in a single cabinet or package of relatively small size. This compact package is easily shipped and installed, readily repaired or replaced should it require service.

Another object is to provide a tubular heat exchanger of the counterflow type for use in a beverage system in combination with an economizer for passing spent refrigerant from the heat exchanger tube in heat exchanging relation to fresh refrigerant entering the heat exchanger tube.

Another and more specialized object is to provide, for use in a beverage system and cooling method of the type employing a pre-cooler for transit containers, a refrigerant circuit for volatile refrigerant which includes in combination a heat exchanger for bringing liquid refrigerant into direct heat exchanging relation to beverage to be chilled thereby and a supplemental heat exchanger for receiving gaseous refrigerant from the beverage chilling heat exchanger, such supplemental heat exchanger being used to cool the air of the pre-cooler chamber.

Another object is to provide, in combination in a beverage system of the type employing a pre-cooling chamber, a cooling unit incorporating specialized tube means of convolved form for direct heat exchange between beverage and liquid refrigerant, the cooling unit also including means for circulating air from the pre-cooling chamber over the convolved tube and return to the pre-cooling chamber for indirect cooling of the latter.

A further object of the invention is to provide a specialized heat exchanger device for use in beverage systems, such heat exchanger comprising tubes of convolved form connected to common inlet and outlet headers so as to be supplied with liquid refrigerant from a common source. Preferentially, beverage or cooling liquid conduits are encased within convolved refrigerant tubes so as to be immersed in and substantially wholly surrounded by liquid refrigerant.

A still further and more specific object of the invention is to provide a heat exchanger of the character mentioned in which a plurality of refrigerant tubes in the form of helices, nested one within another, are connected at their ends to common inlet and outlet headers so that refrigerant from a common source may flow through the several refrigerant tubes simultaneously over helical paths. As a specialized version of this aspect of the invention, it is sought to provide a heat exchanger of helical coil tubes having common inlet and outlet headers, the several helical coils being arranged in substantially coaxial relation with such axis upright, the inlet header being at the bottom and the outlet header being at the top so that refrigerant flowing through the helical tubes travels a generally rising helical path.

Still further objects and advantages pertaining to certain novel and useful features of construction and combinations and arrangements of parts are set forth in the following detailed description of the invention made in connection with the accompanying drawings, forming a part of the specification. Like parts throughout the several views are indicated by the same letters and numerals of reference.

In the drawings:

Figure 1 is a vertical sectional view, partly diagrammatic and with parts broken away and removed, through a beverage storing, cooling and dispensing system, illustrative of and incorporating the principles of the present invention;

Fig. 2 is a fragmentary sectional view, partly diagrammatic, taken horizontally through the top of the chiller or cooling unit and through a small corner portion of the pre-cooler showing the specialized heat exchanger and related parts in plan, parts being broken away and removed for clarity, this view being taken substantially along the line indicated at 2—2 of Fig. 1 and enlarged with respect to that view;

Figure 1:
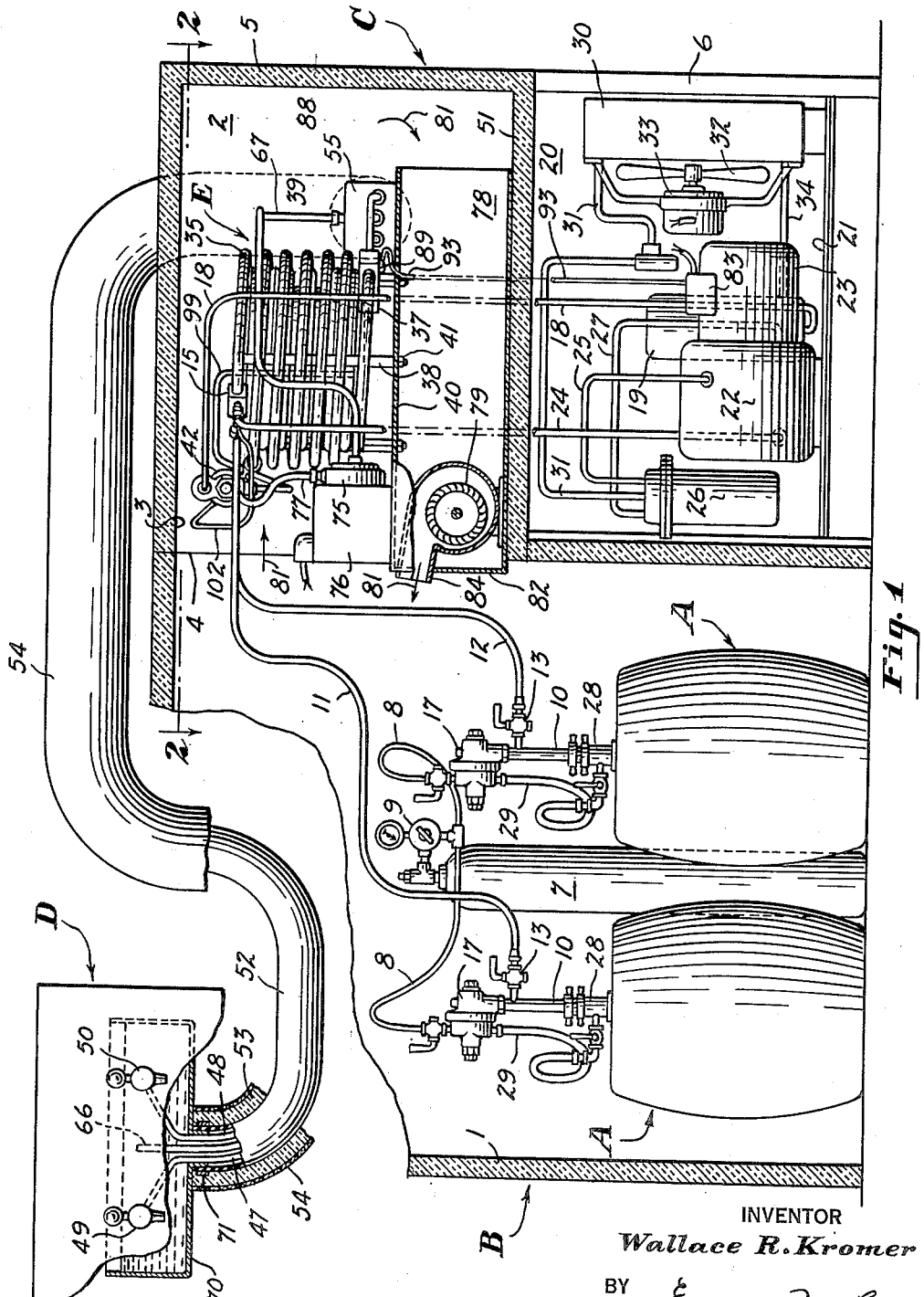
Figure 2:
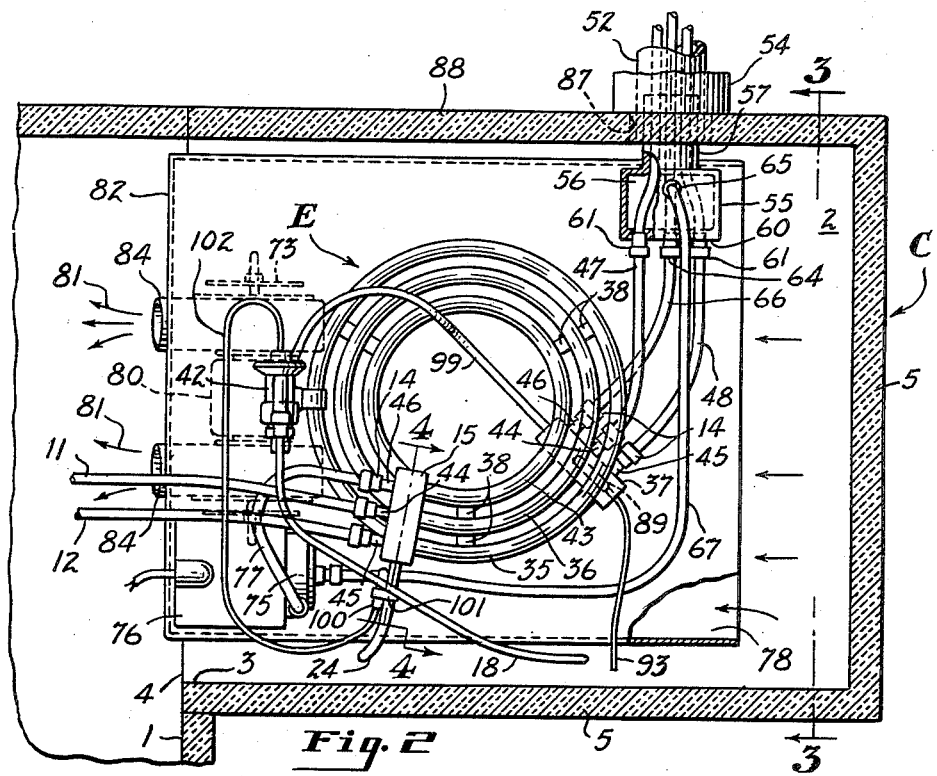
Figures 3, 4:
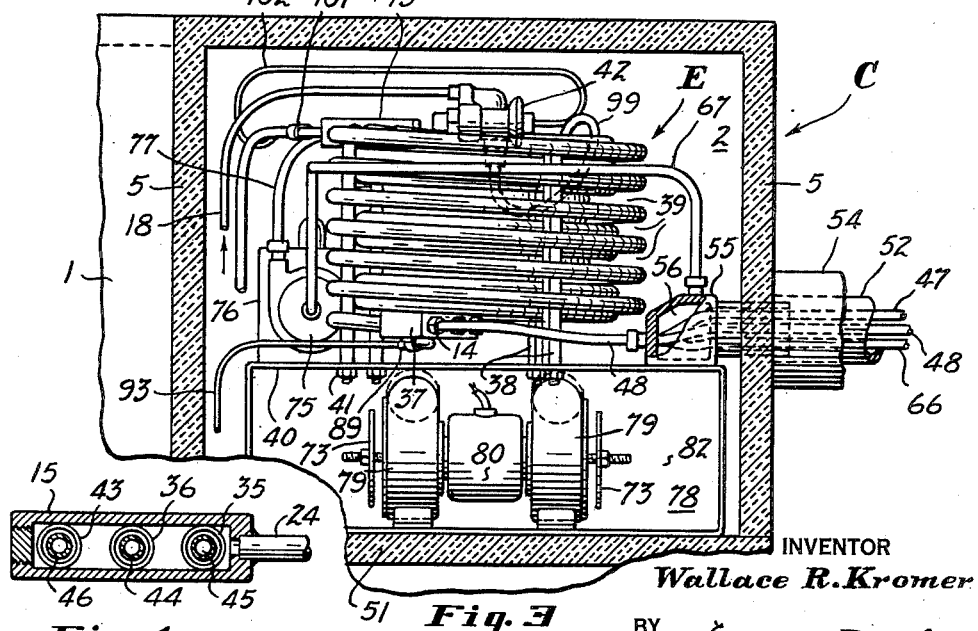
Fig. 3 is a vertical sectional view through the cooling unit, partly diagrammatic and with parts broken away and removed, showing the specialized heat exchanger and related parts in elevation, this view being taken substantially along the line indicated at 3—3 of Fig. 2.
Fig. 4 is a fragmentary sectional detail through the upper header of the convolved tube heat exchanger, this view being taken substantially along the line indicated at 4—4 of Fig. 2 and enlarged with respect to that figure.
Figure 5:
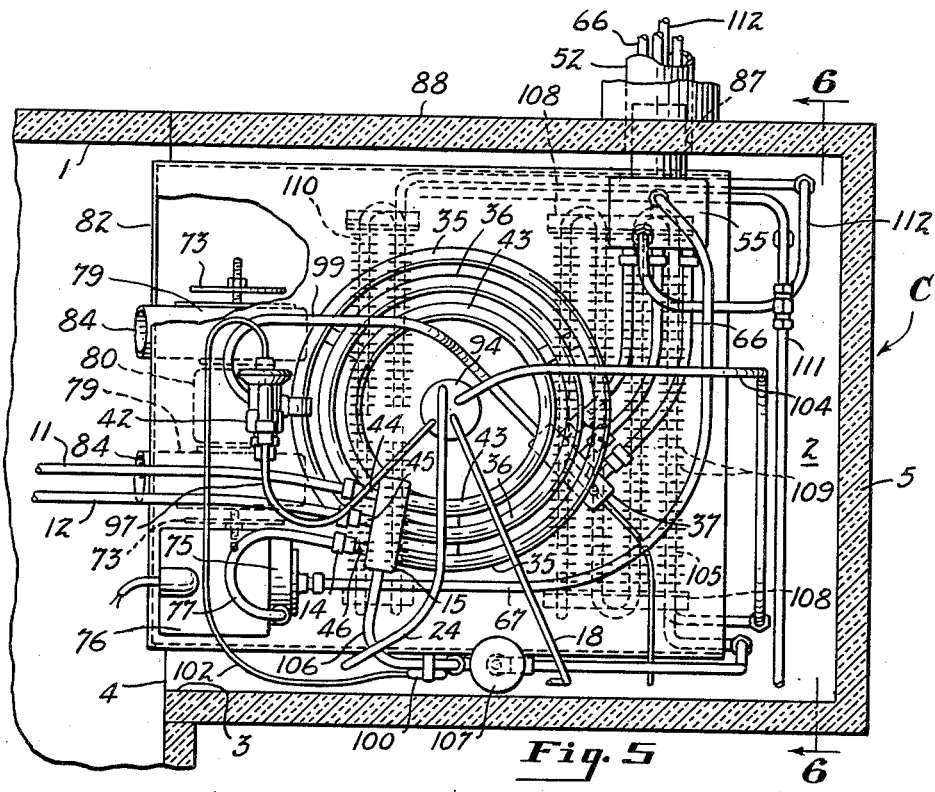
Fig. 5 is a fragmentary horizontal section similar to Fig. 2, showing a modification of the invention.
Figures 6, 7:
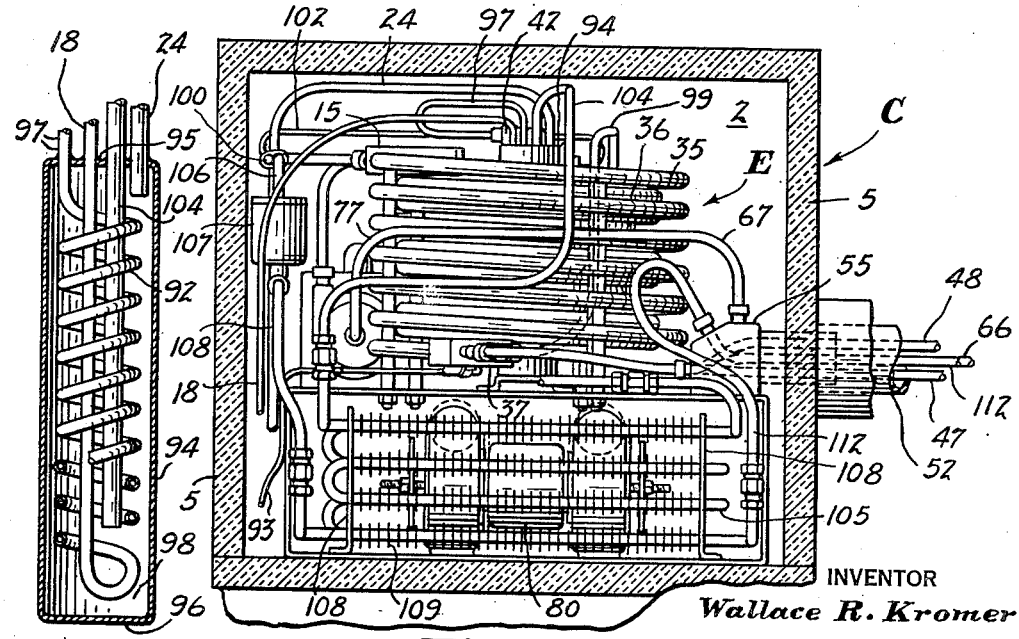

Fig. 6 is a vertical section similar to Fig. 3, showing in elevation the specialized heat exchanger and related parts of the modification of Fig. 5, this view being taken substantially along the line indicated at 6—6 of Fig. 5; and Fig. 7 is a sectional detail taken longitudinally through the economizer utilized in the modification of Figs. 5 and 6, this view being enlarged with respect to those figures.

The structures and devices of the present invention are useful in various types of beverage dispensing systems. The invention has particular utility and value, as explained in the co-pending patent application referred to, in connection with beverage systems employing pre-coolers remote from the dispensing bar. Beverage receptacles or kegs A used in storing and transporting beverages such as beer, ale and the like, are completely enclosed in and surrounded by a pre-cooler cabinet or storage room B so as to be contained in a confined, refrigeratable atmosphere. The pre-cooler B has insulated walls 1 and one or more access doors, not shown, for removal and replacement of the kegs or containers A.

Outside of, but preferably adjacent the pre-cooler B, is a chiller or cooling unit C which includes an insulated chamber 2 in direct communication with the interior of the pre-cooler B through aligned openings 3 and 4 formed in the cooling unit and the pre-cooler respectively. The chamber 2 of the cooling unit has insulated walls 5 supported by the frame or legs 6 of the unit.

Beverage is maintained under pressure in the containers A as by means of a carbon dioxide pressure tank 7 in communication with the containers through conduits 8. The gas pressure in the spaces over the beverages in the several containers is maintained at or slightly above the balance pressure of the beverage as by a regulating valve 9. The conduits 8 may be connected directly to conventional tap rod assemblies similar to the arrangement shown in my copending application for patent referred to. In a preferred arrangement, tap rods 10 are of the type incorporating automatic pressure regulating valves such as disclosed in United States Patent 2,335,595 dated November 30, 1943 and entitled "Beverage Dispenser." In such an arrangement automatic pressure regulating valves 17 carried by the tap rods 10 receive carbon dioxide from the supply tank 7 either directly at relatively high pressure or through the regulating valve 9 which serves as a step-down valve. The automatic valves 17, responsive to temperature conditions of the beverage within the kegs or transit containers A, supply carbon dioxide gas to the individual containers in accordance with the individual temperature requirements so as to maintain the gas pressure in each keg just slightly above the balance pressure. The regulating valves 17 are each connected to hollow tapping fittings 28 by flexible conduits 29. Conventional shut-off valves are provided in the gas conduits 8 and 29 to facilitate assembly and dis-assembly of the parts in placing fresh transit containers on tap and in removal of containers from which the beverage has been exhausted. Thus the carbon dioxide gas pressure in each particular keg is automatically maintained equivalent to or slightly above the desired balance pressure of the beverage contained in each such keg. This individual regulation of the gas pressure in each keg is independent of the other kegs or containers and of the temperature of the surrounding atmosphere outside the keg.

The tap rods 10, whether of the specialized type referred to or of conventional type, extend into the kegs or containers A through the hollow pressure fittings 28 and reach to the bottoms of the containers. The internal pressure maintained within each of the beverage containers through either the specialized regulating valves referred to or through conventional valves forces the beverage through the tap rods and into separate flexible conduits 11 and 12, one for each keg or container on tap. These conduits are connected to the upper ends of the tap rods 10 by separable fittings received on valves 13.

The flexible beverage lines or conduits 11 and 12 extend through the aligned openings 3 and 4 and into the insulated chamber 2 of the cooling unit C. The conduit ends are connected by threaded collars to an upper manifold of a heat exchanger device E of special design. This heat exchanger comprises a plurality of tubes of convolved form, one set of tubes being provided for conducting beverages or other liquids to be chilled and another set being provided for conducting refrigerant. The tubes of one set parallel corresponding tubes of the other set and are so arranged that the beverages or liquids being chilled are maintained substantially in direct heat exchanging relation to liquid refrigerant.

In the arrangement illustrated, the convolved tubes comprising the refrigerant set are arranged in concentric helices of different diameters. These refrigerant tubes of heat conducting metal, are indicated at 35, 36 and 43, and are coaxially arranged about a common upright axis. The upper ends of the tubes are soldered into openings provided in one side of hollow metal top manifold 15. The lower ends of the refrigerant tubes are soldered in side openings of a hollow metal bottom manifold 37. Between the spaced apart coils of the several refrigerant helices and against the sides thereof, are metal uprights 38 which serve the spacers for successive turns of the individual coils as well as for the several helices and as supports for the convolved or helical tubes. These spacers are soldered to the contacting portions of each of the coil turns of the refrigerant tubes, thereby holding the helices in predetermined spaced relation with spaces 39 between adjacent turns of each of the coils. The heat exchanger E is supported on top 40 of a hollow pedestal or box that rests on insulated floor 51 of the chamber 2. The box, formed of sheet metal, is of rectangular section and open at one end to permit controlled air flow therethrough, as will later appear. The lower ends of the spacers 38, of reduced size and threaded, are received through openings in the box top 40 and secured in place by nuts 41.

Extending through the several refrigerant tubes in coaxial relation thereto, are beverage tubes 44 and 45 and coolant tube 46, which have outside diameters less than the inside diameters of the corresponding refrigerant tubes. Each of the inner tubes 44, 45 and 46 is thus surrounded by an annular space extending throughout substantially the entire length of the corresponding convolved refrigerant tube. The inner convolved tubes 44, 45 and 46, which parallel the corresponding refrigerant tubes 35, 36 and 43, provide paths of relatively small cross sectional area for beverages or liquids to be chilled during the travel of such liquids through the chilling zone of the heat exchanger E. These cooling tubes 44, 45 and 46 may be of suitable plastic composition but are preferably made of metal because of its higher rate of heat conductivity. The metal tubes are projected through wall openings in the manifolds 15 and 37. Plastic tubes extend through suitable pressure fittings whereas metal tubes, as shown, are soldered in the openings in the manifold walls to provide the desired pressure type joints that will withstand the pressure developed by the particular refrigerant employed. Connections are made to the projecting ends of the inside tubes 44, 45 and 46 as by means of end fittings indicated at 14 comprising the usual flanged and threaded collars. Other convolved tube arrangements such as grids and flat spirals may be employed in the specialized heat exchanger E in lieu of the helices shown.

The refrigerant tubes of the heat exchanger E receive liquid refrigerant through condit 18 from a conventional refrigerant compressor unit. This compressor unit and related parts are housed in bottom chamber 20 of the cooling unit C. The compressor unit in the chamber 20 includes a pump 22 supported on floor 21 and driven by an electric motor 23. From the receiver 19, containing a readily available supply of liquid refrigerant, such refrigerant is fed to the bottom manifold 37 of the heat exchanger E through the supply conduit 18 that extends upwardly into the chamber 2 of the cooling unit, the flow of the refrigerant being governed by a conventional thermostatically controlled valve 42.

This valve is connected to the bottom of inlet manifold or header 37 by a tube or conduit 99 and is controlled by thermal responsive fluid contained in a hollow bulb 100 fastened as by clip 101 to the return or suction conduit 24 of the refrigerant compressor system. The bulb is located on the suction line closely adjacent the top or outlet header 15 of the heat exchanger E and is connected as by a capillary tube 102 to the flow control or expansion valve 42. This valve is adjusted so that the refrigerant tubes of the heat exchanger E are maintained in a flooded condition. When the temperature of the return line or conduit 24 drops below a predetermined value, such as results when the liquid refrigerant reaches the top of the helical coils, the thermo-responsive fluid in the bulb 100 acts to close or permit closing of the flow control valve 42, thereby restricting or stopping the flow of liquid refrigerant into the bottom header 37. Conversely, when the level of liquid refrigerant in the helical refrigerant tubes of the heat exchanger drops back or recedes from the top header 15, the resulting or accompanying increase in temperature of the return or suction line 24 causes the thermo-responsive fluid in the bulb 100 to act to open the flow control valve, thereby resuming or increasing the flow of liquid refrigerant into the bottom header 37. The flow control valve 42, thus thermostatically controlled, functions to maintain the liquid refrigerant in the heat exchanger E at a predetermined level slightly below the level of the upper or outlet header 15.

The refrigerant employed in the system may be any of the conventional low boiling point liquids such as dichloro-difluoro methane, ammonia, or sulphur dioxide, the temperature within the refrigerant tubes of the heat exchanger E being automatically governed and maintained between about 36° and about 40° F. This control is effected by the thermostatic flow control valve 42 in combination with a compressor control such as a conventional thermo-responsive switch 83 that governs the starting and stopping of the compressor drive motor 23. The switch 83 is responsive to the pressure of a fluid medium in a bulb 89 connected thereto by a capillary tube 93 and secured against and in heat conducting relation to the metal inlet header 37 at the bottom ends of the refrigerant tubes. The switch 83 receives electrical current from a suitable source and operates to start and stop the compressor drive motor so as to withdraw gaseous refrigerant from the upper ends of the refrigerant tubes through the top header 15 in the suction line or conduit 24. The switch is adjusted to maintain the refrigerant within a predetermined temperature and pressure range, such pressure range corresponding, for the particular refrigerant used, to the temperature range at which it is desired to operate the system.

Gaseous refrigerant from the upper manifold 15 of the heat exchanger E flows to the pump inlet through a conduit 24 and the compressed liquid refrigerant is discharged from the pump 22 through a conduit 25 which leads into an oil separator 26. Oil is returned to the pump 22 from the separator through a conduit 27 and the liquid refrigerant is carried to a condenser coil or heat exchanging radiator 30 through a conduit 31. Suitable vents or openings are provided in the walls of the compressor chamber 20 for the flow of cooling air over the coils of the refrigerant condenser 30. The air flow is induced by a fan 32 driven by an electric motor 33 connected in parallel relation to the compressor drive motor. From the lower end of the condenser 30 the cooled liquid refrigerant flows through a conduit 34 into a storage or supply receiver 19.

Beverage conduits or lines 47 are connected to the fittings 14 on the outlet ends of the cooling tubes 44 and 45, respectively. These beverage conduits are flexible tubes of metal or plastic material and extend to a bar or dispensing unit D which is external to but may be either adjacent to or remote from the pre-cooler and the cooling unit. The dispensing unit carries faucets 49 and 50 to which the beverage conduits 47 and 48 are respectively connected.

In passing through the cooling elements or coils 44 and 45 of the heat exchanger E, beverage is quickly brought or cooled to the desired dispensing temperature. It is most desirable that in its travel from the evaporator or cooler to the faucets 49 and 50, no objectionable temperature change or increase occur in the beverage. To this end a liquid coolant filled jacket or conduit 52 surrounds the beverage lines or conduits 47 and 48 from within the insulated chamber 2 of the cooling unit substantially to the faucets 49 and 50. Although in some applications or installations the stabilizing conduit may be of rigid material, suitably insulated, it preferably takes the form of a flexible sheath such as a fabric reinforced rubber hose. The rubber has an insulating effect which reduces the absorption of heat through the walls of the coolant conduit and the flexibility of the rubber hose facilitates installation. The conduit 52 may be additionally insulated as by being embedded in a wrapping or casing or rockwool 53 or other insulating material held in place as by a canvas tube or sheath 54. The rockwool 53 and the retaining sheath or envelope 54 may optionally be used over only such portion of the length of the coolant conduit 52 as is necessary by reason of environmental conditions but preferably extends over the entire length of that portion of the jacket conduit which is external to the cooling unit and the dispensing unit.

Within the insulated chamber 2 of the cooling unit the end of the coolant conduit 52 is fitted with a header or manifold 55 through which the beverage lines 47 and 48 are led into the temperature stabilizing conduit. The manifold is in the form of a hollow cast metal body having a plurality of openings communicating with a common internal chamber 56. The manifold includes a tubular portion 57 which extends into or through opening 87 in the wall 5 of the chiller unit and is received within the end of the coolant conduit 52. The conduit end may be embraced by a clamp (not shown) which causes the conduit to grip the tubular portion of the manifold and provide a fluid tight connection between the parts.

The end of the cooling liquid conduit 52 remote from the chiller or cooling unit C is connected to a tubular connector fitting on the bottom of the tank 70, being held in place as by circular collar or clamp 71. The beverage conduits 47 and 48 thus enter the tank through the bottom and are immersed in the body of liquid contained in the tank, the shanks of the faucets 49 and 50 being extended into the tank 70 below the surface of the cooling liquid for connection thereto, also below such liquid level, of the beverage conduits 47 and 48.

The beverage conduits or lines 47 and 48 extend through openings in end wall 60 of the manifold 55, the openings being aligned with the tubular portion 57 to facilitate threading of the beverage conduits through the stabilizing or coolant conduit 52 in assembly. Glands or collared fittings 61 on the manifold 55 embrace the beverage conduits 47 and 48 and form fluid tight joints. Other openings in the manifold 55 have collared fittings or glands 64 and 65 which provide fluid tight passages for supply and return conduits 66 and 67, respectively, through which coolant liquid flows to and from the temperature stabilizing jacket or conduit.

The cooling liquid supply and return conduits 66 and 67 may comprise metal tubes or rubber or plastic hoses. The supply conduit 66 extends longitudinally through the full length of the coolant or stabilizer conduit 52 and into a tank or expansion receptacle 70 comprising an element of the dispensing unit D.

Cooling liquid such as water fills the space about the conduits 47, 48 and 66 within the conduit 52 and is continuous into the tank 70, the conduits thus being completely immersed, or substantially so, in the cooling liquid from the manifold 55 to the faucets. Cooling liquid is supplied directly to the tank 70 through the inlet conduit 66 and then flows through the full length of the conduit 52 in returning to the manifold 55.

At the manifold end of the cooling liquid jacket or conduit, the cooling liquid is withdrawn through the return conductor 67. This conductor is connected to the inlet of a centrifugal pump or circulator 75 directly connected to and driven by an electric motor 76. The motor is connected, through suitable switch means, not shown, to a suitable source of electrical current so as normally to drive the pump continuously. The pump, located within the chamber 2 of the cooling unit C, draws the coolant from the manifold 55 and forces it into the receiving end of the conduit 46 of the heat exchanger E through a tubular conductor 77. After chilling of the coolant by heat exchange with refrigerant in the tube 43 as the coolant passes through the device E, the coolant is returned to the tank 70 and conduit 52 through the rubber hose or supply conductor 66 previously mentioned.

The cooling of the pre-cooler B is effected by circulating the air or atmosphere of the pre-cooler over and between the convolved tubes of the heat exchanger E. A desirable circulation is induced by forcing the air to flow through a tunnel or passage 78 which extends through the major portion of the length of the chamber 2 of the cooling unit or chiller and is provided in the bottom of the chiller chamber by the metal box on which the heat exchanger E is supported. The passage is open at one or its inner end and is closed at its other end as by means of wall 82 on the metal pedestal box. A pair of damper controlled centrifugal fans 79 mounted within the air passage and driven constantly by a common electrical motor 80 draw air through the tunnel passage and project the air into the chamber or room of the pre-cooler B through outlet tubes 84 formed as continuations of the fan scrolls. These outlets project through openings in the end wall 82 of the pedestal box containing the fans. The motor 80 may be electrically connected in parallel with the coolant circulating motor 76 for continuous operation. By reason of the extension of the tunnel passage 78 into the rear or remote end of the chamber 2 of the cooling unit a continuous flow of air is effected, as indicated by arrows 81, into and out of the chiller chamber 2 through the aligned openings 3 and 4. This flowing air is caused to pass over the heat exchanger E and through the openings or passages between the convolved refrigerant tubes of the latter. Efficient and high rate of cooling of the circulating air is thus provided which maintains the pre-cooler chamber at a desired temperature of from about 40° to about 55° F. This temperature range, although slightly above the desired dispensing temperature, is suitable for storage of the beverage in transit containers or kegs. In this manner, efficient cooling and temperature stabilizing effect is provided for all parts of the beverage circulating system and effective utilization is obtained of the single refrigerant evaporator or heat exchanger E of the cooling apparatus.

The thermostatically controlled switch 83 maintains the refrigerant pressure in the evaporator or heat exchanger E within predetermined limits, the switch being set to cause the compressor to return gaseous refrigerant to the receiver 19 when the pressure (and corresponding temperature) within the evaporator rises above a predetermined value and to stop the motor and compressor when the gaseous pressure (and corresponding temperature) within the evaporator falls below a predetermined value. By thus governing the compressor 22 through a thermal device (bulb 89—switch 83) responsive to the temperature of the refrigerant in the bottom of the evaporator coils, it is possible to obtain effective cooling and temperature stabilization of the beverage with minimum starting and stopping of the compressor.

In the modification shown in Figs. 5 through 7, a refrigerant cycle of improved efficiency is employed and supplemental heat exchangers are provided for cooling drinking water and for augmenting the cooling of the atmosphere of the pre-cooler B.

The liquid refrigerant supply conduit 18, instead of being connected directly to the expansion or flow control valve 42, is connected to a coil 92 of a combination accumulator, economizer and surge tank 94. This tank or device comprises a vertically elongated circular sectioned metal tube of from about two to about three inches in diameter having sealed top and bottom ends 95 and 96, respectively. It is positioned in upright coaxial relation to the helical coil refrigerant tubes 35, 36 and 43 of the heat exchanger E, being of greater height than the helices and extending both above the top and below the bottom of the coils as shown in Fig. 6. It is supported on the top 40 of the metal tunnel box either directly or as by means of the interposed bracket shown. The outlet of the economizer coil 92 is connected by conduit 97 which passes sealingly through the tank top 95 to the inlet of the flow control valve 42. Partly spent refrigerant in the gaseous state or a mixture of gaseous and liquid refrigerant from the heat exchanger E or from the supplemental heat exchanger coil to be later described, enters the economizer 94 through a conductor pipe or tube 104 which extends sealingly through the tank top 95 and downwardly through the economizer chamber 98 to a position relatively close to the bottom of such chamber. The refrigerant return conduit or suction line 24 leading to the compressor 22 is connected sealingly into the tank top 95 to withdraw gaseous refrigerant from the upper region of the chamber 98 of the economizer. Thus any refrigerant either liquid or gaseous which enters the chamber 98 of the economizer tank 94 is caused to pass in heat exchanging relation to the relatively hot or fresh liquid refrigerant flowing through the coil 92 to the flow control valve 42. The fresh liquid refrigerant flowing through the coil 92 is cooled by the spent gaseous refrigerant being drawn back to the compressor through the return conduit 24. Substantial economy is thus obtained in the refrigerant cycle.

To augment the cooling effect of the convolved tube heat exchanger E on air circulating through the chiller chamber 2 from the pre-cooler chamber and to increase the relative cooling capacity of the cooling unit C with respect to the size or capacity of the pre-cooler B, a supplemental or auxiliary air cooling coil or heat exchanger 105 is located in the tunnel passage 78. This supplemental heat exchanger is series connected in the refrigerant return conduit or suction line between the outlet manifold 15 of the convolved coil device and the refrigerant compressor unit 22 in the bottom of the pre-cooler C. A conduit 106 is connected between the outlet header 15 and the inlet of a constant pressure valve 107. The outlet of the valve 107 is connected by conduit 108 to the inlet of the supplemental heat exchanger coil 105, this inlet being located at the bottom of such coil so that the refrigerant flows upwardly through the coil. Thus the coil 105 acts as a dryer in which liquid refrigerant carried over from the convolved coil device is evaporated to prevent return of liquid refrigerant to the compressor 22. The outlet of the heat exchanger coil 105 is connected by the conduit 104, previously mentioned, to the economizer or surge tank 94. The constant pressure valve 107 serves as a control on the flow of refrigerant through the series connected evaporators and maintains the refrigerant pressure in the convolved coil unit E within predetermined limits so that the beverage flowing through such convolved coil device is cooled to a temperature within the desired dispensing range. If desired, the auxiliary evaporator coil 105 may be supported on brackets 108 and may be provided with metal fins 109 to increase its heat transfer efficiency.

Also located in the air passage or tunnel 78 provided by the sheet metal supporting box is a tubular heat exchanger 110 of the metal fin type which cools drinking water. This drinking water cooler is located between the supplemental refrigerant heat exchanger 105 and the air circulating fans 79 so as to be subjected to the cooling effect of air that has previously been chilled by both the convolved tube heat exchanger and the supplemental heat exchanger 105 prior to the projection of such chilled air into the pre-cooler room. A conduit 111 from a suitable source of supply such as a city water system brings fresh drinking water to the inlet end of the heat exchanger 110 and the chilled drinking water is conducted to a faucet at the dispensing bar through a tubular metal conductor 112 which extends through the stabilizing conduit 52 and is immersed in the circulating coolant carried by the latter. As shown in Fig. 6, the conductor 112 enters the stabilizing conduit 52 through the manifold 55.

In the storing, cooling and dispensing of beverage in accordance with the method of the present invention and by means of the apparatus described, advantage is taken of the cooling characteristics of volatile refrigerant to obtain a more uniform, rapid and efficient cooling of the beverage. In earlier systems of the so-called chilled jacket or refrigerated conduit type, such as disclosed in my prior Patent 2,485,610, issued October 25, 1949, the beverage lines or conduits extending between the transportation kegs or containers in the pre-cooler and the faucets of the dispensing bar are immersed only in a liquid cooling medium such as water or brine. The heat transfer rate from beverage flowing in a beverage tube or line to such a liquid coolant (as distinguished from volatile refrigerant) surrounding a beverage line or tube is limited by factors such as the sensible heat absorbing capacity of the coolant and the convection currents induced or set up in the coolant. Accordingly, the prior chilled conduit systems required relatively long beverage tubes or lines, beverage tubes of relatively small cross section, relatively slow beverage withdrawal rates, or combinations of these limiting factors. Faster draft rates, rather than slower ones, are now being sought. Long beverage lines are objectionable because of cost, installation difficulty, and cleaning and maintenance difficulties.

Systems utilizing relatively small beverage tubes, such, for example, as $\frac{5}{16}''$ diameter or less, require the use of relatively high gas pressure in the keg or transportation container in order to overcome the resistance to flow or restriction in the beverage conduit resulting from the small cross sectional area of the latter. In order to obtain adequate flow volume through the dispensing faucet, conventional chilled conduit systems using small cross sectional area beverage lines frequently require keg pressures in excess of thirty-five pounds per square inch. A beverage such as beer or ale normally has a carbon dioxide content requiring or producing in the keg only from about fourteen to about eighteen pounds per square inch pressure at a temperature of about 45° to about 50° Fahrenheit. Hence it is not desirable to utilize carbon dioxide gas alone to establish the high pressure required in conventional chilled conduit dispensing systems—to do so would result in over-carbonization of the beverage. As an alternative, high pressure air is customarily introduced into the keg to provide the necessary keg pressure which, as mentioned above, may be as high as about thirty-five pounds. But the use of air over the beverage in the keg is unsatisfactory for many reasons including objections to the introduction into the keg of odors, bacteria, and the like.

The method and apparatus of the present invention not only overcome difficulties of and objections to conventional chilled beverage line systems by utilization of the latent heat of vaporization of a volatile refrigerant in the direct absorption of heat from the beverage being cooled and by conducting the cooled beverage from the point of cooling or chilling to the point of dispensing through a conduit surrounded by a medium maintained at the desired dispensing temperature, as explained in my copending application referred to, but accomplish such ends in a more efficient manner and at the same time effect economies in costs of construction, assembly and repair. Cheaper and fewer parts are used.

Substantially the entire drop in the temperature of the beverage from the keg or transportation container to the dispensing faucet normally occurs in or during the travel of the beverage through the tubes or coils 44 and 45 within the evaporator refrigerant tubes 36 and 35, the thermal responsive switch 83 (as controlled by the bulb 89) being set or adjusted to maintain the volatile refrigerant in the evaporator tubes of the heat exchanger at about 38° Fahrenheit so as to cool the beverage and the circulating coolant to that temperature. The primary function of the liquid coolant in the conduit 52 is not to lower the beverage temperature but to maintain the beverage in the conduits 47 and 48 at the desired dispensing temperature after the beverage has been reduced to such temperature in its passage through the coils or conduits 44 and 45.

Volatile refrigerant, thus used as the direct acting cooling medium for absorbing heat in the beverage being cooled provides a relatively high rate of heat transfer through the walls of the conduits 44 and 45, the heat absorbed by the refrigerant causing vaporization or boiling off of the refrigerant. Neither long beverage lines or tubes nor beverage tubes of small diameters or cross sectional areas are required. It has been found satisfactory, for example, to make the beverage conduits 11 and 12 leading to the chiller E and also the beverage conduits 47 and 48 extending between the chiller and the dispensing faucets of circular sectioned tubing having an internal diameter of about $\frac{3}{8}''$. The convolved internal tubes 44 and 45 in the heat exchanger are formed of thin walled metal tubes of about $\frac{3}{8}''$ internal diameter. The total length of any beverage line from the transportation container or keg A to one of the dispensing faucets 49 or 50 is not critical by reason of the fact that cooling of the beverage is primarily effected in the volatile refrigerant heat exchanger E. The relatively large cross section of each of the tubes comprising the line avoids objectionable throttling or restriction in the lengths normally used such as would require gas pressure in the keg greatly in excess of the balance pressure of the normal or brewed in carbon dioxide content of the beverage. Since the tubes 47 and 48 are not relied upon to cool the beverage, they can be of whatever length is convenient to the particular installation being made—in some instances being as short as about six feet or less in length—depending chiefly upon the distance between the pre-cooler B and the chiller C, on the one hand, and the dispensing bar D, on the other hand.

Each of the inside tubes 44, 45 and 46 immersed in the liquid volatile refrigerant contained in the heat exchanger E has a length preferably of from about eighteen to about thirty feet so that, in normal installation, the aggregate length of each one of the beverage lines is in the neighborhood of about twenty-eight to about forty feet. When the beverage lines are formed of tubes having an internal diameter of about ⅜" satisfactory operation results when maintaining a carbon dioxide or gas pressure of from about fourteen to about twenty-four pounds per square inch within the keg. The pressure variation results chiefly from fluctuations in the temperature of the beverage in the transportation containers A, depending usually upon how long they may have been stored in the pre-cooler B prior to tapping. The automatic valves 17 maintain the pressure within the desired range in accordance with the beverage temperature.

The relatively low gas pressure in the keg of the present apparatus and system thus permits advantageous use of the automatic gas pressure regulating valves and tap rods shown in Patent 2,335,595 referred to above, although the use of such automatic valves is not essential to practice of all aspects of the present invention. Carbon dioxide gas can be used alone and in lieu of air in the space over the beverage in the transportation container or keg to force the beverage through the beverage line without objectionably over-charging or over-carbonating such beverage. Contamination and airation of the beverage is avoided. Low pressure drop or loss through the beverage lines of the present system permits the gas pressure maintained in the keg to be determined by considerations of beverage quality, palatability and preservation rather than by any necessity for maintaining relatively high pressures to force the beverage through the lines.

The utilization of a circulating liquid coolant in the conduit or jacket 52 and at substantially the same temperature as the beverage to maintain the chilled beverage at the desired dispensing temperature as it flows from the quick chilling heat exchanger E to the faucets 49 and 50 insures delivery of the beverage at the desired dispensing temperature. Except for variations resulting from the heat absorption external to the evaporator 16, the liquid coolant in the conduit 52 is maintained substantially at the same temperature as beverage flowing through the tubes or lines 47 and 48.

In accordance with the patent statutes the principles of the present invention may be utilized in various ways, numerous modifications and alterations being contemplated, substitution of parts and changes in construction being resorted to as desired, it being understood that the embodiments of the present system shown in the drawings and described above and the particular method set forth are given merely for purposes of explanation and illustration without intending to limit the scope of the claims to the specific details disclosed.

What I claim and desire to secure by Letters Patent of the United States is:

1. In a beverage storing, cooling and dispensing system of the type having a dispensing unit and a pre-cooler having an air atmosphere, and employing transit containers in the pre-cooler with beverage conduits connecting the containers to the dispensing unit, the improvement which comprises a cooling unit for chilling the atmosphere of the pre-cooler and the beverage conduits, said unit including a cold chamber having an air atmosphere and a refrigerant compressor insulated from one another, tubes of convolved form in substantially direct heat exchanging relation to the atmosphere of the cold chamber, conductor means extending between the ends of said tubes and the compressor to supply fresh refrigerant to the tubes and to return spent refrigerant to the compressor, said conductor means including an economizer located in the cold chamber and providing passages for carrying spent refrigerant in heat exchange relation to liquid refrigerant being supplied to the tubes, one portion of each beverage conduit substantially paralleling one of the convolved tubes and being in direct heat exchanging relation through solid material of relatively high heat conductivity to refrigerant therein, means for circulating air from the pre-cooler into and out of the cold room, the circulating air being directed over the convolved tubes in heat exchanging relation to refrigerant in the latter, and control means governing the supply and return of refrigerant to maintain the refrigerant in the convolved tubes within a predetermined beverage dispensing temperature range.

2. In a beverage storing and dispensing system of the type having a dispensing unit and a pre-cooler room for beverage transit containers and beverage conduits extending between transit containers in the pre-cooler to the dispensing unit, the improvement which comprises the combination of a cooling liquid conduit for enclosing the beverage conduits and a cooling unit for cooling the pre-cooler and for supplying coolant to the cooling conduit to cool the beverage conduits, said cooling unit including a cabinet structure adapted to be disposed against the outside of the pre-cooler and having an opening to receive the beverage conduits, one end of the cooling conduit being disposed within the cooling unit, tubes of convolved form in the cooling unit, means for supplying liquid refrigerant to the tubes, the beverage conduits including portions substantially paralleling the convolved tubes and in direct heat exchanging relation through solid material of relatively high heat conductivity to refrigerant therein, means for circulating a liquid coolant through the cooling conduit and in direct heat exchanging relation to refrigerant in one of the convolved tubes, and means governing the refrigerant supply means to maintain the refrigerant within a predetermined beverage dispensing temperature range within the convolved tubes.

3. In a beverage storing and dispensing system of the type having a dispensing unit and a pre-cooler room for beverage transit containers and beverage conduits extending between transit containers in the pre-cooler to the dispensing unit, the improvement which comprises the combination of a cooling liquid conduit for enclosing the beverage conduits and a cooling unit for cooling the pre-cooler and for supplying coolant to the cooling conduit to cool the beverage conduits, said cooling unit including a cabinet structure adapted to be disposed against the outside of the pre-cooler and having an opening to receive the beverage conduits, one end of the cooling conduit being disposed within the cooling unit, tubes of convolved form in the cooling unit, means for supplying liquid refrigerant to the tubes, the beverage conduits including portions substantially paralleling the convolved tubes and in direct heat exchanging relation through solid material of relatively high heat conductivity to refrigerant therein, means for circulating a liquid coolant through the cooling conduit and in direct heat exchanging relation to refrigerant in one of the convolved tubes, means for flowing air from the pre-cooler into and out of the cooling unit and over the convolved tubes in heat exchanging relation to the latter, and means governing the refrigerant supply means to maintain the refrigerant within a predetermined beverage dispensing temperature range within the convolved tubes.

4. In a beverage cooling system of the type having a pre-cooler and a dispensing unit, a refrigerating structure comprising a pair of tube conduits disposed in substantially parallel relation for direct heat exchange through solid material of relatively high heat conductivity between liquids carried therethrough, said tubes being of convolved form and arranged as a grille having through openings, means for supplying a volatile refrigerant to one of the tube conduits in liquid form, beverage conduit means extending from the pre-cooler to one end of the other tube conduit, other beverage conduit means extending from the other end of said other tube conduit to the dispensing unit, and means for forcing a circulation of air through the grille openings of the convolved tubes and into and out of the pre-cooler.

5. In apparatus for storing, cooling and dispensing beverage including means providing a pre-cooling chamber for beverage storage containers, a dispensing faucet outside the chamber, and a beverage conduit for connecting the faucet to a storage container in the pre-cooling chamber, improved means for cooling the chamber and the beverage conduit comprising in combination a tube of convolved form and means enclosing the convolved tube in and in heat exchanging relation directly through material of high heat conductivity to a substantially confined air atmosphere, a heat exchanger, and a refrigerant supply unit, means connecting the refrigerant supply unit to the convolved tube and to the heat exchanger for the serial flow of refrigerant from the unit first through the convolved tube, then through the heat exchanger and then return to the unit, a portion of the beverage conduit substantially paralleling the convolved tube and being disposed substantially in direct heat exchanging relation through solid material of relatively high heat conductivity to refrigerant in such convolved tube, and means for flowing air from the pre-cooling chamber over and in heat exchanging relation directly through material of high heat conductivity to refrigerant in the convolved tube, over the heat exchanger and then back to the chamber.

6. In apparatus for storing, cooling and dispensing beverage including means providing a pre-cooling chamber for beverage storage containers, a dispensing faucet outside the chamber, and a beverage conduit for connecting the faucet to a storage container in the pre-cooling chamber, improved means for cooling the pre-cooling chamber and the beverage conduit comprising a plurality of tubes of convolved form, hollow headers, said tubes being connected to common inlet and outlet headers, means for supplying fresh refrigerant to the inlet header and withdrawing spent refrigerant from the outlet header, a portion of the beverage conduit extending through one of the convolved tubes and immersed in refrigerant contained in the latter, a tubular jacket enclosing another portion of the beverage conduit, a coolant conductor extending through another of the convolved tubes and immersed in liquid refrigerant in said other convolved tube, means for circulating cooling liquid serially through the tubular jacket and said coolant conductor, and means for circulating pre-cooling chamber air and passing the circulating air over the convolved tubes in heat exchanging relation thereto.

7. In apparatus for storing, cooling and dispensing beverage including means providing a pre-cooling chamber for beverage storage containers, a dispensing faucet outside the chamber, and a beverage conduit for connecting the faucet to a storage container in the pre-cooling chamber, improved means for cooling the chamber and the beverage conduit comprising in combination hollow headers, tubes of convolved form having connection with common inlet and outlet headers, a heat exchanger, a refrigerant supply unit, means connecting such unit, heat exchanger, and headers for the serial flow of refrigerant through the convolved tubes and the heat exchanger, a portion of the beverage conduit substantially paralleling one of the convolved tubes and being disposed substantially in direct heat exchanging relation through solid material of relatively high heat conductivity to refrigerant in said one convolved tube, a tubular jacket containing cooling liquid enclosing another portion of the beverage conduit and immersing such other portion of the beverage conduit in the cooling liquid therein, a cooling liquid conductor paralleling another of the tubes of convolved form and being disposed substantially in direct heat exchanging relation to refrigerant in such other tube, means for circulating cooling liquid serially through the cooling liquid conductor and through the jacket, and means for circulating the air in the pre-cooling chamber and causing such air to flow over the tubes of convolved form and also over the heat exchanger.

8. In apparatus for storing, cooling and dispensing beverage, the combination of a pre-cooler having a beverage container therein, a chiller and a dispenser, the chiller comprising convolved tube means providing a plurality of pairs of separate generally parallel fluid paths, beverage conduit means including one portion extending from the beverage container to the chiller and including another portion extending from the chiller to the dispenser, said portions of the beverage conduit means being connected by one of the fluid paths of one pair of the convolved tube means, a tubular jacket enclosing a part of said other portion of the beverage conduit means, means for circulating a cooling liquid over one of the paths of another pair of the convolved tube means and through the jacket, means for supplying refrigerant to the other fluid paths of each of the pairs of the convolved tube means, and means for circulating air from the pre-cooler over the convolved tube means and return.

9. In apparatus for storing, cooling and dispensing beverage, the combination of a pre-cooler having a beverage container therein, a chiller and a dispenser, the chiller comprising a convolved tube, means for supplying refrigerant to the tube and circulating the refrigerant therethrough, a beverage conduit extending from the beverage container in the pre-cooler through the chiller and to the dispenser, a portion of the beverage conduit within the chiller substantially paralleling the convolved tube and being substantially in direct heat exchanging relation through solid material of relatively high heat conductivity to refrigerant in the latter, a tubular jacket enclosing a portion of the beverage conduit between the chiller and the dispenser, means providing a circuit for the serial flow of cooling liquid through the tubular jacket and through the chiller, means for circulating a liquid coolant through such circuit, and means for circulating air from the pre-cooler into and out of the chiller and over the convolved tube in the latter.

10. In apparatus for storing, cooling and dispensing beverage, the combination of a pre-cooler having a beverage container therein, a chiller and a dispenser, the chiller comprising a convolved tube, means for supplying refrigerant to the tube and circulating the refrigerant therethrough, a beverage conduit extending from the beverage container in the pre-cooler through the chiller and to the dispenser, a portion of the beverage conduit within the chiller paralleling the convolved tube and being substantially in direct heat exchanging relation to refrigerant in the latter, a tubular jacket enclosing a portion of the beverage conduit between the chiller and the dispenser, a heat exchanger in the chiller connected to the convolved tube to receive refrigerant from the latter, means connecting the tubular jacket and the heat exchanger for series flow of liquid coolant therethrough, and means for flowing air from the pre-cooler into and out of the chiller and over both the convolved tube and the heat exchanger.

11. In apparatus for storing, cooling and dispensing beverage, the combination of a pre-cooler having a beverage container, a chiller and a dispenser, the chiller comprising a plurality of convolved tubes connected at their ends to common inlet and outlet manifolds, means for supplying fresh refrigerant to the inlet manifold and withdrawing spent refrigerant from the outlet manifold, a beverage conduit extending from the beverage container in the pre-cooler through the chiller and to the dispenser, a portion of the beverage conduit in the chiller substantially paralleling one of the convolved tubes and being disposed in substantially direct heat exchanging relation through solid material of relatively high heat conductivity to refrigerant in such one tube, a tubular jacket enclosing a portion of the beverage conduit between the chiller and the dispenser, a cooling liquid conduit paralleling another of the convolved tubes and disposed substantially in direct heat exchanging relation through solid material of relatively high heat conductivity to refrigerant in such other tube, means for circulating a cooling liquid serially through the tubular jacket and the cooling liquid conduit, and means governing the refrigerant supply means to maintain the refrigerant in the convolved tubes within predetermined beverage dispensing temperature limits.

12. In apparatus for storing, cooling and dispensing beverage, the combination of means providing a pre-cooler chamber having a beverage container therein, a chiller and a dispenser, the chiller comprising hollow manifolds and a plurality of convolved tubes connected at their ends to common inlet and outlet manifolds, means for supplying fresh liquid refrigerant to the inlet manifold and withdrawing spent gaseous refrigerant from the outlet manifold, a beverage conduit extending from the beverage container in the pre-cooler through the chiller and to the dispenser, a portion of the beverage conduit in the chiller substantially paralleling one of the convolved tubes and being disposed in substantially direct heat exchanging relation through solid material of relatively high heat conductivity to refrigerant in such tube, a tubular jacket enclosing a portion of the beverage conduit between the chiller and the dispenser, a cooling liquid conduit paralleling another of the convolved tubes and being disposed in substantially direct heat exchanging relation through solid material of relatively high heat conductivity to refrigerant in such other tube, means for circulating a cooling liquid serially through the tubular jacket and the cooling liquid conduit, means for flowing air from the pre-cooler chamber over the convolved tubes and return to the pre-cooler chamber, and control means governing the supply of liquid refrigerant to the convolved tubes.

13. In combination in a beverage storing and cooling system, means providing a pre-cooler chamber having insulated walls for receiving beverage transit containers and storing the latter in a chilled atmosphere, the pre-cooler also having an opening in one wall thereof, a cooling unit disposed adjacent the pre-cooler and formed with an opening registered with the opening in the wall of the pre-cooler, headers, a plurality of tubes of convolved form in the cooling unit and connected to common inlet and outlet headers, means external to the cooling unit for supplying liquid refrigerant to the inlet header and withdrawing spent refrigerant from the outlet header, beverage conductors in substantially direct heat exchanging relation to refrigerant in the convolved tubes, means for connecting the beverage conductors to transit containers in the insulated wall chamber of the pre-cooler, dispensing faucets external to the pre-cooler and to the cooling unit, means for connecting the beverage conduits to the faucets, conduit means external to the pre-cooler and to the cooling unit for carrying liquid coolant in heat exchange relation to the last named beverage connecting means, a heat exchange means in the cooling unit, means connecting the heat exchange means and the conduit means for the serial flow of cooling liquid therethrough, and means for circulating air from the chamber of the pre-cooler through the cooling unit, over the convolved tubes and return.

14. In the system of storing and dispensing a carbonated beverage wherein the beverage is retained at the place of dispensing in a transit container, the improved cooling method which comprises placing a transit container containing the beverage in a confined atmosphere, withdrawing beverage from the transit container in a continuous stream of small cross-sectional area, passing the continuous stream through a chilling zone comprising only a fractional portion of the entire length of the stream and located relatively close to the transit container, supplying fresh liquid refrigerant to the chilling zone in heat exchanging relation to the beverage stream to cool the latter, conducting partially spent refrigerant away from the chilling zone into an air cooling zone, circulating the air of the confined atmosphere serially through the chilling zone in heat exchanging relation to the liquid refrigerant therein and also through the air cooling zone in heat exchanging relation to the partially spent refrigerant in the latter zone to complete the evaporation of the refrigerant in such air cooling zone, withdrawing completely evaporated refrigerant from the air cooling zone, and compressing the withdrawn refrigerant to liquefy the same for re-use in the cycle.

15. In the system of storing and dispensing a carbonated beverage wherein the beverage is retained at the place of dispensing in a transit container, the improved cooling method which comprises placing a transit container containing the beverage in a confined atmosphere, withdrawing beverage from the transit container in a continuous stream of small cross-sectional area, passing the continuous stream through a chilling zone comprising only a fractional portion of the entire length of the stream and located relatively close to the transit container, circulating a liquid coolant in heat exchanging relation to the beverage stream after the latter has passed beyond the chilling zone, conducting the circulating liquid coolant through the chilling zone, supplying fresh liquid refrigerant to the chilling zone in heat exchanging relation to the beverage stream and to the liquid coolant, conducting partially spent refrigerant away from the chilling zone into an air cooling zone, circulating the air of the confined atmosphere serially through the chilling zone in heat exchanging relation to the liquid refrigerant therein and also through the air cooling zone in heat exchanging relation to the partially spent refrigerant in the latter zone to complete the evaporation of the refrigerant in such air cooling zone, and compressing the withdrawn refrigerant to liquefy the same for re-use in the cycle.

References Cited in the file of this patent

UNITED STATES PATENTS

| Number | Name | Date |
| --- | --- | --- |
| 2,039,188 | Reeves | Apr. 28, 1936 |
| 2,071,133 | Martin | Feb. 16, 1937 |
| 2,076,922 | Simard | Apr. 13, 1937 |
| 2,140,816 | Seitz | Dec. 20, 1938 |
| 2,150,233 | Martin | Mar. 14, 1939 |
| 2,230,905 | Popky | Feb. 4, 1941 |
| 2,327,910 | Levine | Aug. 24, 1943 |
| 2,335,595 | Kromer et al. | Nov. 30, 1943 |
| 2,398,262 | Swart | Apr. 9, 1946 |
| 2,447,769 | Pringey | Aug. 24, 1948 |
| 2,500,684 | Johnson | Mar. 14, 1950 |